(12) United States Patent
Wong et al.

(10) Patent No.: US 9,235,424 B1
(45) Date of Patent: Jan. 12, 2016

(54) MANAGING THE PERFORMANCE OF A DATA PROCESSING SYSTEM THROUGH VISUALIZATION OF PERFORMANCE METRICS DATA VIA A COGNITIVE MAP

(71) Applicant: CA, Inc., Islandia, NY (US)

(72) Inventors: Wendy Phillipa Wong, Sydney (AU); Alan James Garner, Warburton (AU)

(73) Assignee: CA, Inc., New York, NY (US)

( * ) Notice: Subject to any disclaimer, the term of this patent is extended or adjusted under 35 U.S.C. 154(b) by 163 days.

(21) Appl. No.: 13/954,628

(22) Filed: Jul. 30, 2013

(51) Int. Cl.
*G06T 11/20* (2006.01)
*G06F 9/44* (2006.01)

(52) U.S. Cl.
CPC .............. *G06F 9/44* (2013.01); *G06T 11/206* (2013.01)

(58) Field of Classification Search
CPC . G06T 11/206; G06F 3/0481; H04L 41/0213; H04L 29/08072; H04L 29/06
USPC .................................. 345/440; 709/223, 224
See application file for complete search history.

(56) References Cited

U.S. PATENT DOCUMENTS

| | | | | |
|---|---|---|---|---|
| 5,479,592 A | * | 12/1995 | Stenhouse | G06F 17/18 345/440 |
| 5,615,323 A | * | 3/1997 | Engel et al. | 345/440 |
| 2010/0275263 A1 | * | 10/2010 | Bennett | G06F 21/577 345/440 |
| 2011/0096074 A1 | * | 4/2011 | Agarwal | 345/440 |
| 2011/0261055 A1 | * | 10/2011 | Wong et al. | 345/440 |
| 2014/0375650 A1 | * | 12/2014 | Grundstrom | G06F 19/363 345/440 |
| 2015/0170382 A1 | * | 6/2015 | Bhatia | G06T 11/20 345/440 |

* cited by examiner

*Primary Examiner* — Chante Harrison
(74) *Attorney, Agent, or Firm* — Myers Bigel Sibley & Sajovec, P.A.

(57) ABSTRACT

A method includes performing operations as follows on a processor: defining a bearing map having an axis corresponding to a first metric, the first metric being based on system management performance for a first defined time interval, defining an object sketch map corresponding to a second metric, the second metric being based on system management performance for a second defined time interval, and combining the bearing map and the object sketch map so as to generate a cognitive map. The cognitive map includes a data object having a position on the axis based on a first value for the first metric and an appearance based on a second value for the second metric.

27 Claims, 10 Drawing Sheets

| | High Total Byte Volume and Low Total Connection Count | High Total Byte Volume and High Total Connection Count |
|---|---|---|
| ↑ Vertical Range, Total Byte Volume (Cumulative since system startup) | "Bulk Network Data Users"<br><br><br><br><br><br>*Often high volume data transfer products or file copy tasks...* | "Heavy Network Users"<br>('heavy hitters, top talkers, network hogs, etc')<br><br><br><br><br>*often database servers, transaction servers, middleware servers, backend products behind application servers...* |
| | Low Total Byte Volume and Low Total Connection Count<br><br>This sector functions as a 'grading area'. Applications here may be "New Network Users" on their way to accumulating high totals and moving to other sectors.<br>Or, they may be repeated "Light Network Users" with genuinely low connection/volume needs (but enough current throughput to get into the Top N)<br><br>*All applications at startup; applications that stay in the area are often dynamic scheduler tasks, dynamic data transfer control tasks, some telnet....* | Low Total Byte Volume and High Total Connection Count<br><br><br>"Frequent Network Users"<br><br><br><br><br><br><br>*Often http servers, communications gateways, ...* |
| Origin | Horizontal Range, Total Connection Count → (Cumulative since system startup) | |

*FIG. 7*

|  |  |  | etc |
|---|---|---|---|
| ● | ⬤ | ⬤ |  |
| Application has had relatively small byte throughput in the last 5 minutes, but right now it has a high number of active connections (over 20). | Application has had relatively large byte throughput in the last 5 minutes, but right now it has a very low number of active connections (1 to 5). | Application had a medium amount of byte throughput in the last 5 minutes, but right now is doing no network activity because it has no active connections. |  |

*FIG. 8*

| ↑ Total Byte Volume | High Total Byte Volume and Low Total Connection Count ●  Application has a high active current connection count, though not much throughput. Could be doing things differently to usual? | High Total Byte Volume and High Total Connection Count ⬤  Application has had some throughput recently, but right now is doing nothing. In the past it has been very busy. |
|---|---|---|
|  | Low Total Byte Volume and Low Total Connection Count  Application may have just started, since it has both a low total connection and total byte count. Right now it has the highest recent byte throughput, but not many active connections. Depending on its activity characteristics it may move in any direction from here.  ⬤ | Low Total Byte Volume and High Total Connection Count  Application seems to be behaving typically, it usually has a medium-high number of connections and relatively low byte throughput, and it is like that now too.  ○ |
|  | Total Connection Count → | |

MANAGING THE PERFORMANCE OF A DATA PROCESSING SYSTEM THROUGH VISUALIZATION OF PERFORMANCE METRICS DATA VIA A COGNITIVE MAP

BACKGROUND

The present disclosure relates to computing systems, and, in particular, to performance management of computing systems.

Computer systems management data comprises fault, performance and utilization measurements. These data are commonly visualized as time-series style charts with multiple data sets plotted against time on the x-axis. A typical such polyline chart might display either a single systems management metric with a separate data set for each different resource/object, or a single object with a separate data set for each different systems management metric.

A time-series chart typically displays consecutive time intervals that show the transition of measurements from one point in time of interest to another. Each transitional time interval along the way is displayed with many data points. A time-series chart may then be combined with more than one y-axis scale and with optional time interval instrumentation. Together, combining all this information in this manner may deliver a lot of visual noise, which may obscure the presence of significant patterns of system activity.

The visual noise difficulty may be exacerbated by large numbers of resources or objects present in commercial-scale enterprise networks. Because of the time and logistical challenges with manually comparing large numbers of time-series charts, detailed performance or workload analysis reporting may be restricted to the key system objects only. Because an enterprise may depend on the performance analysis to identify what the key system objects are, they may be reduced to guessing which of perhaps tens of thousands of objects deserve special monitoring. The current volatility of enterprise systems and networks with the introduction of cloud and Software as a Service (SaaS) architectures may make system usage even more unpredictable.

For enterprise IT business requirements, such as application performance management, infrastructure management, and service delivery management, companies may need the ability to quickly isolate who the major system resource users are to diagnose and response to user problems and service level breaches in a timely manner. This may require retrieving and sorting appropriate metrics for all existing objects of a type, and displaying only a "Top N" by a suitable measure. Time-series charts with multiple data sets on a line chart may not be a practical way to display comparative "Top N" data. "Top N" data is generally presented in non-graphical tables or low quality ordered bar charts. A "Top N" bar chart may be restricted to displaying a single metric, which may require several "Top N" bar charts to be manually visually compared.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

In some embodiments of the inventive subject matter, a method comprises performing operations as follows on a processor: defining a bearing map having an axis corresponding to a first metric, the first metric being based on system management performance for a first defined time interval, defining an object sketch map corresponding to a second metric, the second metric being based on system management performance for a second defined time interval, and combining the bearing map and the object sketch map so as to generate a cognitive map. The cognitive map comprises a data object having a position on the axis based on a first value for the first metric and an appearance based on a second value for the second metric.

In other embodiments, the appearance is a shape and/or a color of the data object on the cognitive map.

In still other embodiments, the axis is a first axis and defining the bearing map comprises defining the bearing map having the first axis corresponding to the first metric and a second axis perpendicular to the first axis corresponding to a third metric, the first metric and the third metric being based on system management performance over the first defined time interval and the first axis and the second axis defining a two dimensional grid. The cognitive map comprises the data object having a position on the two dimensional grid based on the first value for the first metric and a third value for the third metric and an appearance based on the second value for the second metric.

In still other embodiments, defining the object sketch map comprises defining the object sketch map corresponding to the second metric and a fourth metric, the second metric and the fourth metric being based on system management performance for the second defined time interval and a third defined time interval, respectively. The cognitive map comprises the data object having the position on the two dimensional grid based on the first value for the first metric and the third value for the third metric, a shape based on the second value for the second metric, and a color based on a fourth value for the fourth metric.

In still other embodiments, the cognitive map comprises a plurality of data objects having positions on the axis based on a plurality of first values for the first metric and a plurality of appearances based on a plurality of second values for the second metric, respectively.

In still other embodiments, the method further comprises selecting one of the plurality of data objects for removal and generating the cognitive map based on remaining ones of the plurality of data objects by excluding the one of the plurality of data objects that was selected for removal.

In still other embodiments, the method further comprises defining filter criteria based on the first metric, the second metric, a pattern formed by the plurality of data objects, a transition between patterns formed by the plurality of data objects over time, and/or time; and applying the filter criteria to the plurality of data objects of the cognitive map to identify which ones of the plurality of data objects satisfy the filter criteria.

Other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As used herein, the term "data processing facility" includes, but is not limited to, a hardware element, firmware component, and/or software component. A data processing system may be configured with one or more data processing facilities.

As used herein, "system management performance" of a data processing system includes, but it not limited to, the performance of processor elements, hardware elements, software elements, firmware elements, storage elements, memory elements, communication networking elements, and/or communication channel elements. Thus, "system management performance" may encompass the performance of a computer system, a suite of computer systems, the operating system, application software, and other software/firmware components that run on the computer system(s) and the communication network(s) that connect with the computer system(s).

Some embodiments of the inventive subject matter stem from a realization that that status of a data processing system may be conveyed using parallel maps: a bearing map and an object sketch map. A "bearing map" divides visualized space into different areas or cognitive spaces or sectors based on the number of performance metrics being evaluated. The sector of a bearing map conveys some information about all data objects in that sector. Each sector may have a logical meaning relevant to the performance analysis of the data processing system. An "object sketch map" defines an appearance for a data object based on one or more metrics. For example, a data object may have a shape based on a value for a first metric and a color based on a value for a second metric. The bearing map and object sketch map can be combined to generate a cognitive map such that, for example, the shape and/or color of a data object on the cognitive map indicate value(s) for one or more metrics and the location of the data object, i.e., which sector the data object resides in indicates values for other metrics. In this way, the activity, health, and status of a data processing system may be conveyed using the cognitive map theory of parallel maps—the bearing map and the object sketch map. The human brain may more readily integrate data from these two maps to get a more extensive mental picture of the data processing system environment than it can by reviewing lists or tables of numerical data.

Figure 1:
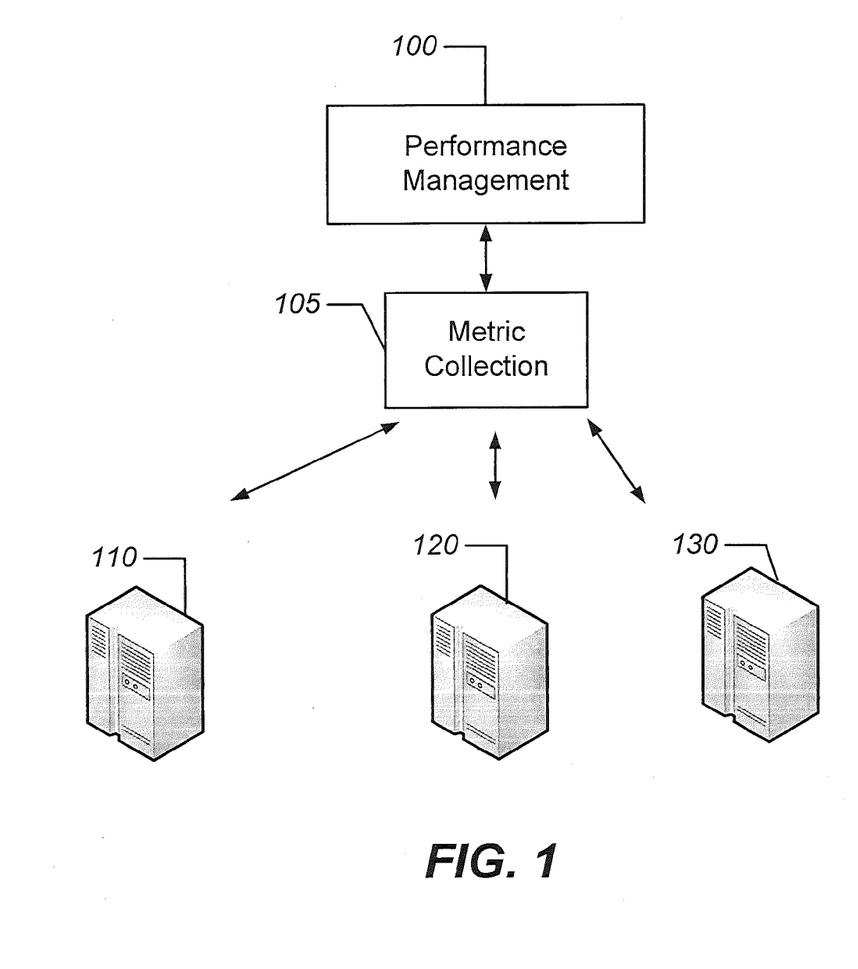
FIG. 1 is a block diagram of a system for managing the performance of one or more data processing systems through visualization of performance metrics data via a cognitive map according to some embodiments of the present inventive subject matter.

FIG. 1 is a block diagram of a system for managing the performance of one or more data processing systems through visualization of performance metrics data via a cognitive map according to some embodiments of the present inventive subject matter. A performance management system 100 is connected to three data processing systems 110, 120, and 130 via a metric collection module 105. The metric collection module 105 is configured to communicate with the three data processing systems 110, 120, and 130 to collect performance data from the three data processing systems 110, 120, and 130 for various performance metrics and provide the data to the performance management system 100 for processing. Although three data processing systems 110, 120, and 130 are shown, it will be understood that the performance of fewer or more data processing systems can be managed in accordance with various embodiments of the inventive subject matter.

Figure 2:
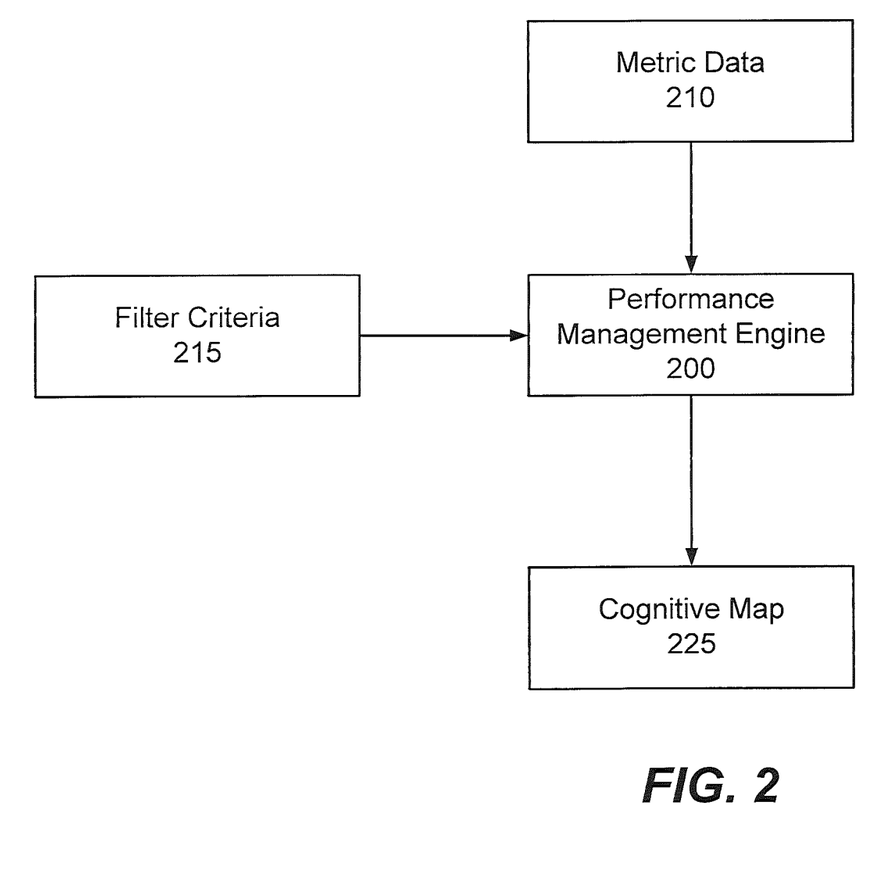
FIG. 2 is a block diagram that illustrates the performance management system of FIG. 1 according to some embodiments of the inventive subject matter.

FIG. 2 is a block diagram that illustrates the performance management system 100 of FIG. 1 according to some embodiments of the inventive subject matter. The performance management system 100 comprises a performance management engine 200 that receives performance metric data 210 from one or more data processing systems. Based on this metric data 210, the performance management system generates a cognitive map 225 by combining a bearing map and an object sketch map to provide a visualization of the data objects corresponding to values for various defined performance metrics. The performance management engine 200 may also receive various filter criteria including companding requests for one or more data objects to customize the cognitive map and better visualize particular data of interest.

Although FIGS. 1 and 2 illustrate a performance management system for managing the performance of one or more data processing systems according to some embodiments of the inventive subject matter, it will be understood that embodiments of the present invention are not limited to such configurations, but are intended to encompass any configuration capable of carrying out the operations described herein.

Figure 3:
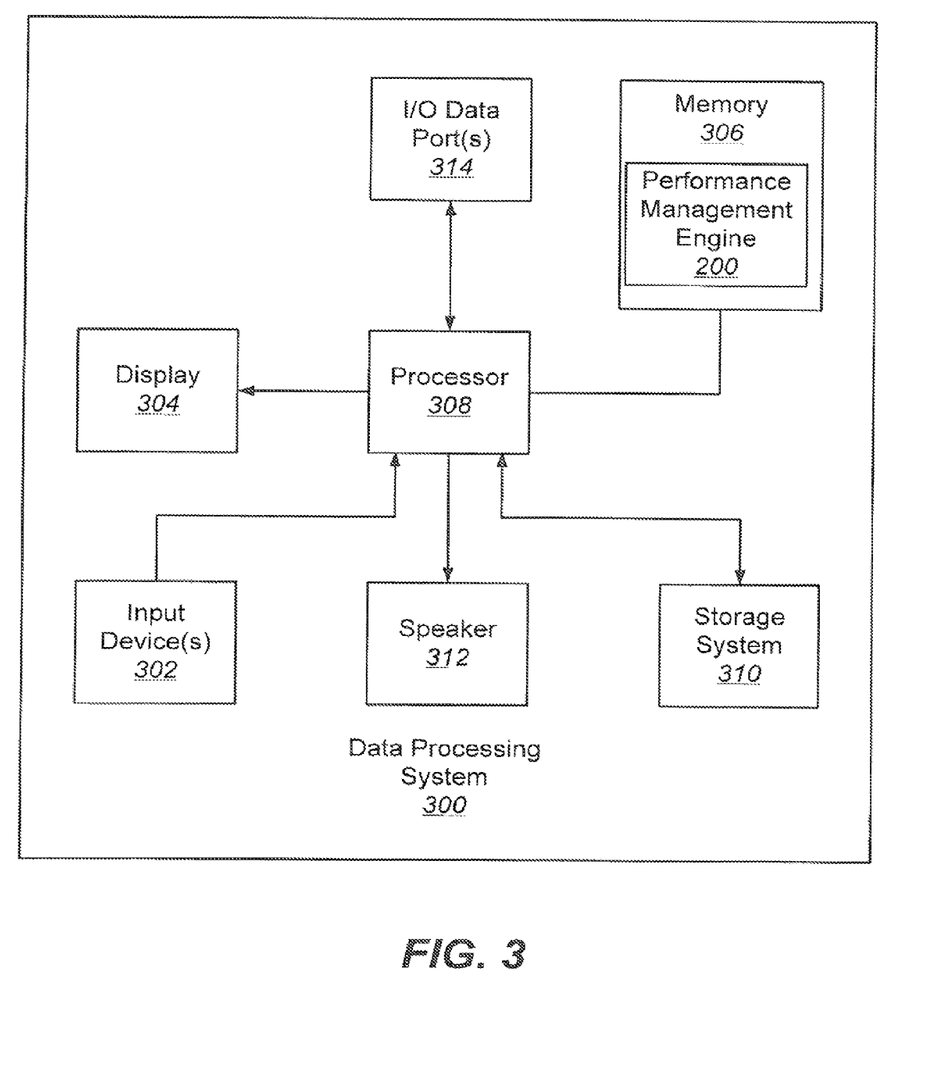
FIG. 3 illustrates a data processing system that may be used to implement the performance management engine of FIG. 2 according to some embodiments of the inventive subject matter.

Referring now to FIG. 3, a data processing system 300 that may be used to implement the performance management engine 200 functionality of FIG. 2, in accordance with some embodiments of the inventive subject matter, comprises input device(s) 302, such as a keyboard or keypad, a display 304, and a memory 306 that communicate with a processor 308. The data processing system 300 may further include a storage system 310, a speaker 312, and an input/output (I/O) data port(s) 314 that also communicate with the processor 308. The storage system 310 may include removable and/or fixed media, such as floppy disks, ZIP drives, hard disks, or the like, as well as virtual storage, such as a RAMDISK. The I/O data port(s) 314 may be used to transfer information between the data processing system 300 and another computer system or a network (e.g., the Internet). These components may be conventional components, such as those used in many conventional computing devices, and their functionality, with respect to conventional operations, is generally known to those skilled in the art. The memory 306 may be configured with a performance management engine module 200 that may be configured to manage the performance of one or more data processing systems through visualization of performance metrics data via a cognitive map.

Figure 4:
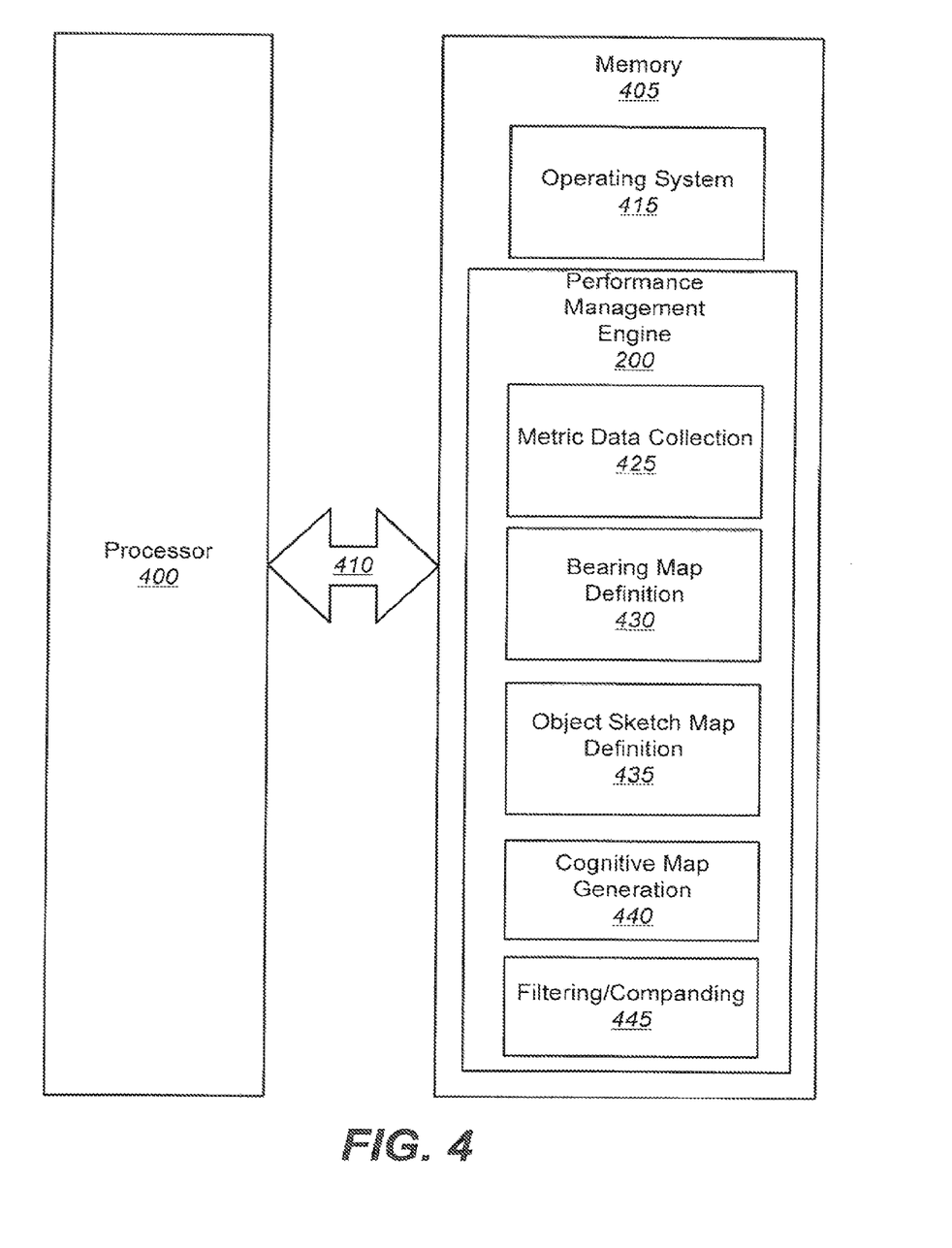
FIG. 4 is a block diagram that illustrates a software/hardware architecture for managing the performance of one or more data processing systems through visualization of performance metrics data via a cognitive map according to some embodiments of the present inventive subject matter.

FIG. 4 illustrates a processor 400 and memory 405 that may be used in embodiments of data processing systems, such as the performance management engine 200 of FIG. 2 and the data processing system 300 of FIG. 3, respectively, for managing the performance of one or more data processing systems through visualization of performance metrics data via a cognitive map according to some embodiments of the inventive subject matter. The processor 400 communicates with the memory 405 via an address/data bus 410. The processor 400 may be, for example, a commercially available or custom microprocessor. The memory 405 is representative of the one or more memory devices containing the software and data used for managing the performance of one or more data processing systems through visualization of performance metrics data via a cognitive map in accordance with some embodiments of the inventive subject matter. The memory 405 may include, but is not limited to, the following types of devices: cache, ROM, PROM, EPROM, EEPROM, flash, SRAM, and DRAM.

As shown in FIG. 4, the memory 405 may contain up to two or more categories of software and/or data: an operating system 415 and a performance management engine module 200. The operating system 415 generally controls the operation of the data processing system. In particular, the operating system 415 may manage the data processing system's software and/or hardware resources and may coordinate execution of programs by the processor 400. The performance management engine module 200 may be configured to managing the performance of one or more data processing systems by collecting performance metric data and then generating a cognitive map to allow system administrators, technicians, engineers, managers, etc. to better evaluate system performance through improved visualization of the metric data. The performance management engine module 200 comprises a metric data collection module 425, a bearing map definition module 430, an object sketch map definition module 435, a cognitive map generation module 440, and a filtering/companding module 445.

The metric data collection module 425 may be configured to communicate with one or more data processing systems to collect performance data for one or more system performance metrics. The performance data may be associated with a variety of different performance metrics that are based on, for example, defined time intervals including, but not limited to, cumulative performance metrics, e.g., metrics associated with system management performance since a defined start time, and metrics that are associated system management performance for a defined time interval, e.g., the last two hours, the last two days, between two specific times, etc.

The bearing map definition module 430 may be configured to define a map in which each axis comprising the map is associated with a system performance metric. For example, when two system performance metrics are defined, the bearing map definition module 430 may, for example, define a bearing map comprising a grid with a horizontal axis corresponding to one system performance metric and a vertical axis corresponding to another system performance metric. The grid may define positional areas or sectors that indicate relative characteristics of data objects within each sector. A bearing map may have any number of sectors with a variety of different visual representations being possible in accordance with various embodiments of the inventive subject matter. For example, the bearing map definition module 430 may define a bearing map in which two axes are used for two system performance metrics in which one axis is a circle and the other axis is the distance from the center of the circle with various sectors being represented as pie slices within the circle.

The object sketch map definition module 435 may be configured to define an object sketch map in which the appearance of a data object is associated with a defined time interval system management performance metric. For example, the value of a first metric associated with a defined time interval may be represented by the shape of the data object. The value of a second metric associated with a defined time interval may be represented by the color of the data object. The object sketch map, may, therefore, be used to represent the N most significant data objects with respect to one or more system performance metrics for a defined time interval.

The cognitive map generation module 440 may be configured to combine the bearing map and the object sketch map such that the shape and/or color, for example, of a data object on the cognitive map indicate value(s) for one or more system management performance metrics associated with a defined time interval(s) and the location of the data object, i.e., which sector the data object resides in indicates values for system management performance metrics associated with other defined time interval(s), such as, for example, a cumulative time interval having a start time and continuing until a snapshot of the metric data is collected. It will be understood, however, that the various ones of the time intervals associated with the performance metrics for both the object sketch map and the bearing map may be the same as each other and or different from each other in any combination in accordance with various embodiments of the inventive subject matter.

The filtering/companding module 445 may be configured to define filter criteria that can be based on any of the metrics used in the cognitive map. The filter criteria can be applied to the data objects of the cognitive map to identify which objects satisfy the criteria. Compound criteria can be used in some embodiments of the inventive subject matter. For example, criteria can be developed to identify a single data object based on its sector position, size, color, and time interval. Other criteria can be developed to identify multiple objects based on their relative sector positions, sizes, and colors at a specific time interval. Single and multiple objects may be identified using filter criteria based on how their position, size, and/or color changes over a sequence of time intervals. Filter criteria can also be used to identify a pattern formed by the data objects in a cognitive map. A particular pattern of the data objects in the cognitive map, which may include aspects of the data objects associated with the object sketch map, such as shape, size, color, etc., may be indicative of potential problems in the operation of the computer system, may be indicative of particular operations taking place on the computer system, e.g., maintenance, a high data processing workload, a high I/O workload, etc. A system administrator may be able to more readily tell what state a computer system is in by viewing a pattern of data objects on the cognitive map without having to examine the details of the actual numerical values of the data that comprise the cognitive map. Moreover, the system administrator may use filter criteria to identify other times when a computer system's performance matches a particular pattern of data objects on the cognitive map. In still other embodiments of the inventive subject matter, filter criteria can be used to identify changes or transitions in patterns of data objects in a cognitive map over time. For example, filter criteria can be used to identify when one or more data objects move from one sector of the cognitive map to another sector of the cognitive map and/or change appearance.

A query language can be used to input filter criteria in some embodiments of the inventive subject matter. The filter criteria may be associated with various alert or event monitoring rules, e.g., if one or more data objects are identified based on particular filter criteria, then an alarm may be generated. The filtering/companding module 445 may also operate in conjunction with specialized analytical processors for performing predictive analysis for various performance metrics.

Figure 5A:
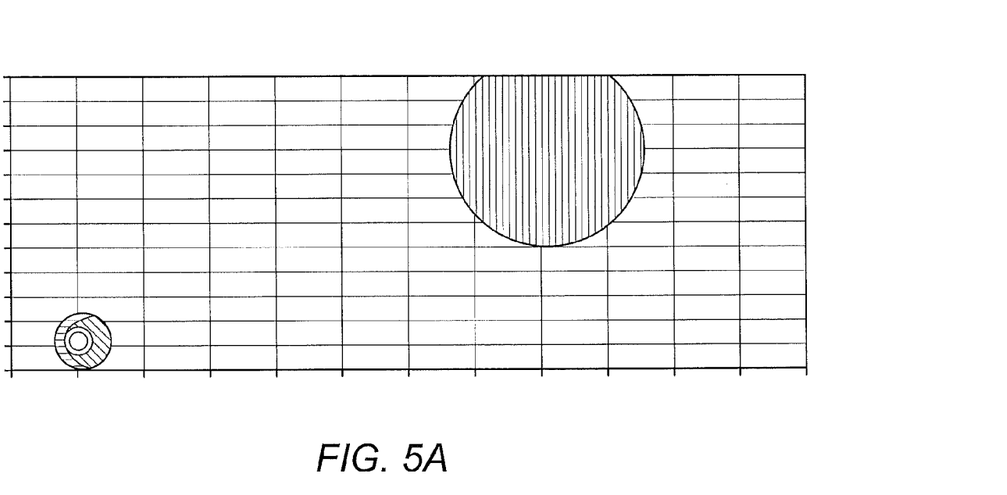
FIGS. 5A and 5B are cognitive maps that illustrate companding operations according to some embodiments of the present inventive subject matter.
Figure 5B:
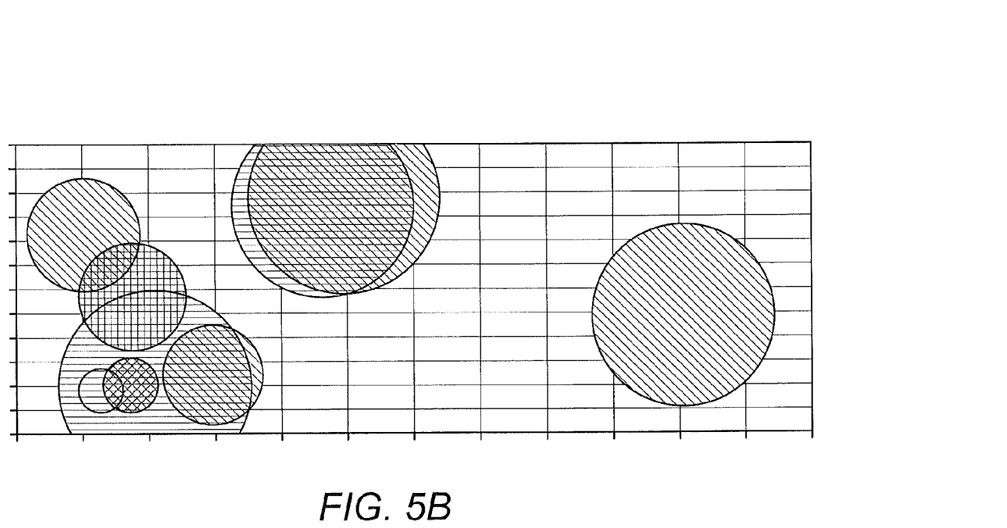

The filtering/companding module 445 may be further configured to provide a companding functionality in which a data object is removed from the cognitive map, i.e., compressed to zero, to allow for regeneration of the cognitive map without the removed data object. A data object may be removed from the cognitive map for various reasons, including business reasons (it represents testing, scheduled, or otherwise inconsequential activity) or to improve visualization of other data objects (it obscures or dominates other data objects on the cognitive map). Such companding allows for recalculation of the relative sizes of the remaining data objects on the object sketch map as well as the range limits on the axes comprising the bearing map. By removing, for example, the physically largest data object on the cognitive map, the effect is to provide more room on the map for display of the remaining data objects and thereby making their relationships with each other clearer to see. This is illustrated, for example, in FIGS. 5A and 5B. FIG. 5A is a cognitive map on which ten data objects are displayed. Nine of the data objects, however, substantially overlap each other while one large data object is set apart from the other nine as shown in FIG. 5A. After removal of the largest data object, the relationships between the other nine data objects can be better visualized as shown in FIG. 5B.

Although FIG. 4 illustrates hardware/software architectures that may be used in data processing systems, such as the performance management engine 200 of FIG. 2 and the data processing system 300 of FIG. 3, for managing the performance of one or more data processing systems through visualization of performance metrics data via a cognitive map according to some embodiments of the present inventive subject matter, it will be understood that the present invention is not limited to such a configuration but is intended to encompass any configuration capable of carrying out operations described herein. Moreover, the functionality of the data processing system 300 of FIG. 3 and the hardware/software architecture of FIG. 4 may be implemented as a single processor system, a multi-processor system, a multi-core processor system, or even a network of stand-alone computer systems, in accordance with various embodiments.

Computer program code for carrying out operations of data processing systems discussed above with respect to FIG. 4 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Figure 6:
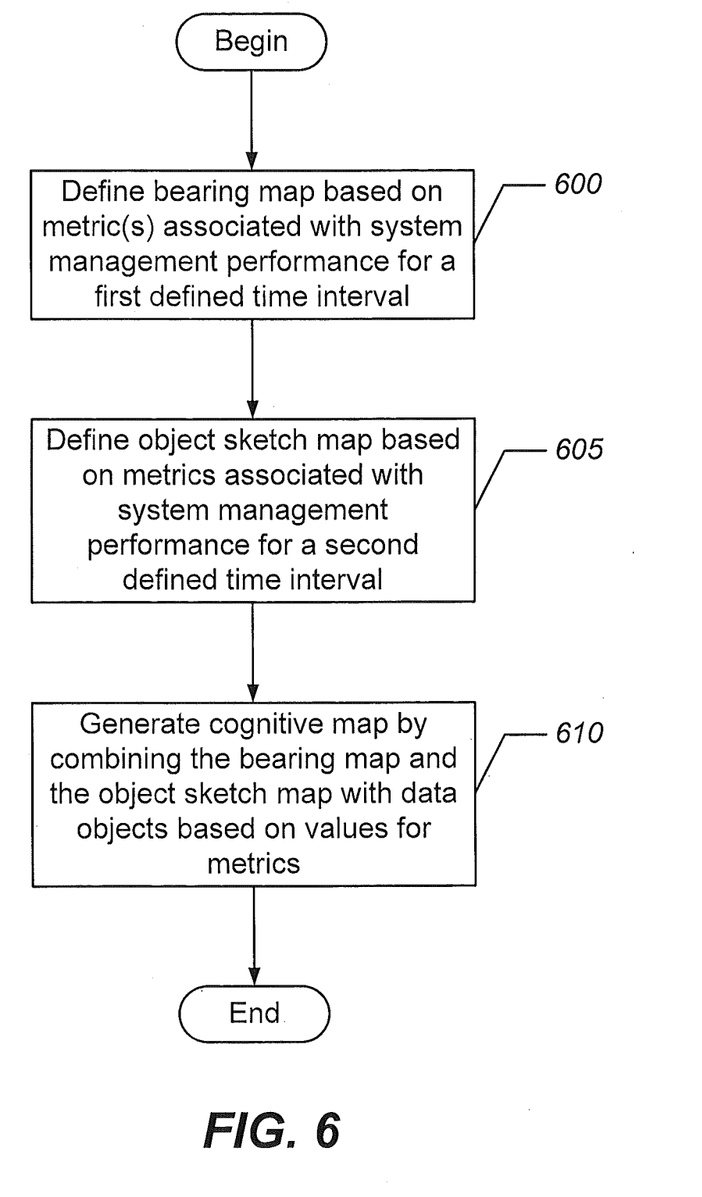
FIG. 6 is a flowchart that illustrates operations for managing the performance of one or more data processing systems through visualization of performance metrics data via a cognitive map according to some embodiments of the present inventive subject matter.

FIG. 6 is a flowchart that illustrates operations for managing the performance of one or more data processing systems through visualization of performance metrics data via a cognitive map according to some embodiments of the present inventive subject matter. Operations begin at block 600 where a bearing map is defined based on metric(s) associated with system management performance for a first defined time interval, such as, for example, cumulative system management performance since a start time. When implemented with a four-sector bearing map, for example, two cumulative system performance metrics, MV and MH, provide four positional sectors of the bearing map indicating these relative characteristics of a data object within that area: 1) both MV and MH low, 2) MV low and MH high, 3) MV high and MH low, and 4) both MV and MH high. Visualization of the bearing map may include warning, problem, or threshold positions that are indicated using lines, shading, and other visual techniques to separate the map sectors and regions within map sectors.

At block 605, an object sketch map may be defined based on metrics associated with system management performance for a second defined time interval. The object sketch map may represent the N most significant objects at a moment in time and/or for a particular time interval. Two system performance metrics MS and MC may be defined that are associated with a time interval and are represented in the data object's appearance, such as the size/shape of the data object and color of the data object.

A cognitive map is generated at block 610 by combining the bearing map and object sketch map with data objects based on values for the metrics MV, MH, MS, and MC. The metric data is provided to the performance management engine 200 and the data is sorted using the metric MS to include only the top N data objects based ranked based on this metric. For each of these N objects, values for the metrics MS, MC, MV, and MH are determined. The cognitive map is generated such that metric MV is plotted on the vertical range, metric MH is plotted on the horizontal range, metric MS determines the size of each of the N data objects, and metric MC determines the color of each of the N data objects. The vertical and horizontal ranges and labels are scaled to suit the continuous or discrete values of MV and MH. The data object sizes are scaled to convey correct relative sizes between the N data objects. An individual data object may in following time intervals successively have the same metric MS values, but appears as different absolute sizes, because it is now relative bigger or smaller than the other data objects. The data objects may overlap depending on the choice of metrics and the performance of the system.

Figure 7:
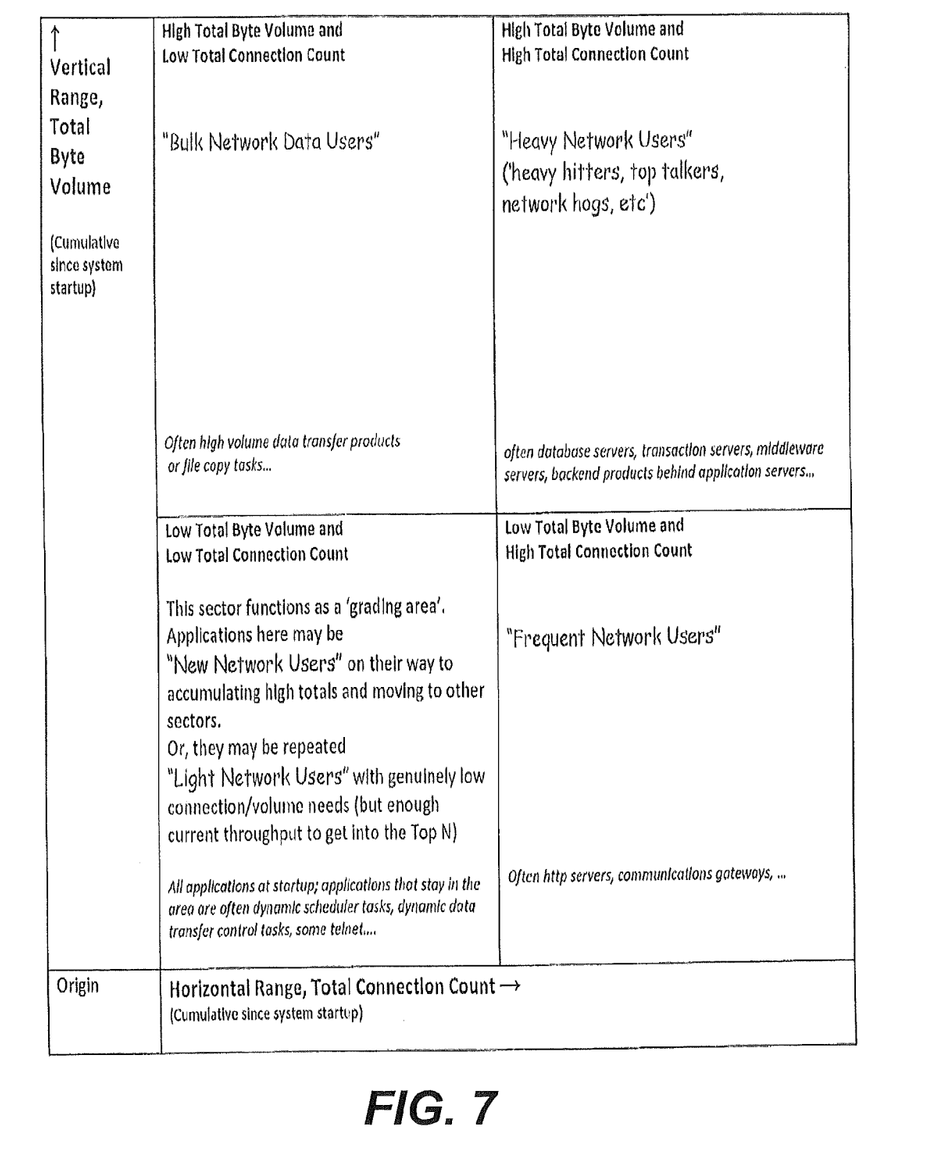
FIG. 7 is a bearing map for visualizing the performance of a mainframe computer system according to some embodiments of the inventive subject matter.

Embodiments of the inventive subject matter may be illustrated by way of example. The performance of a mainframe computer system may be visualized via a cognitive map according to some embodiments of the inventive subject matter. A four sector bearing map is used to represent IP network activity and indicates cumulative overall network activity since the last restart of the mainframe computer system. Two cumulative network activity metrics are used to define the bearing map: 1) MV, along the vertical axis is total bytes. This is the overall volume of network traffic, in bytes, transferred to and from the mainframe application since system startup. The mainframe application can have IP network traffic involving multiple TCP ports, multiple network interfaces, multiple remote addresses, and the like. 2) MH, along the horizontal axis, is total connections. This is the overall count of the number of TCP connection requests that have been received by the mainframe application since system startup. Mainframe TCP servers may have connection characteristics that vary from large numbers of small-volume connections (e.g., HTTP) to small numbers of large-volume connections (e.g., Telnet, FTP), and everything between. The bearing map for this example is illustrated in FIG. 7.

Figure 8:
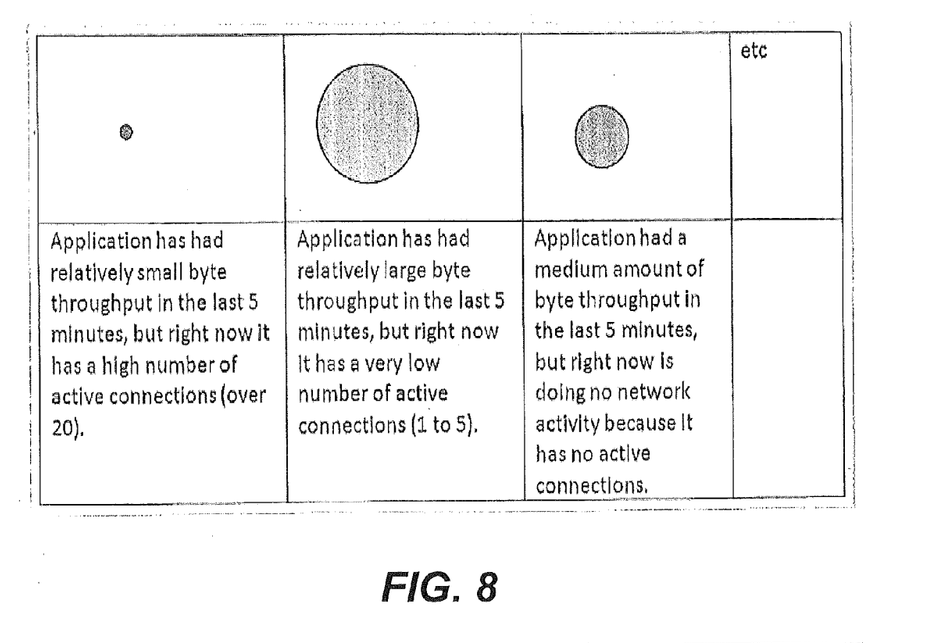
FIG. 8 is an object sketch map for visualizing the performance of a mainframe computer system according to some embodiments of the inventive subject matter.

The object sketch map is defined to represent the current top ten mainframe applications. A first performance metric MS is defined to be the last interval bytes. This is the volume of network traffic, in bytes, transferred to and from the mainframe application in the last interval, e.g., the last 5 minutes, last 60 minutes, etc. The value of the data for the last interval bytes metric determines the relative size of the data object. The last interval bytes metric is used to sort the metric data obtained from the mainframe computer system to identify the top ten data objects. A second performance metric MC is defined to be active connections. This is the number of currently still active TCP connections at the time the object sketch map is generated. The value of the data for the active connections metric determines the color of the data object. The object sketch map for this example is shown in FIG. 8.

Figure 9:
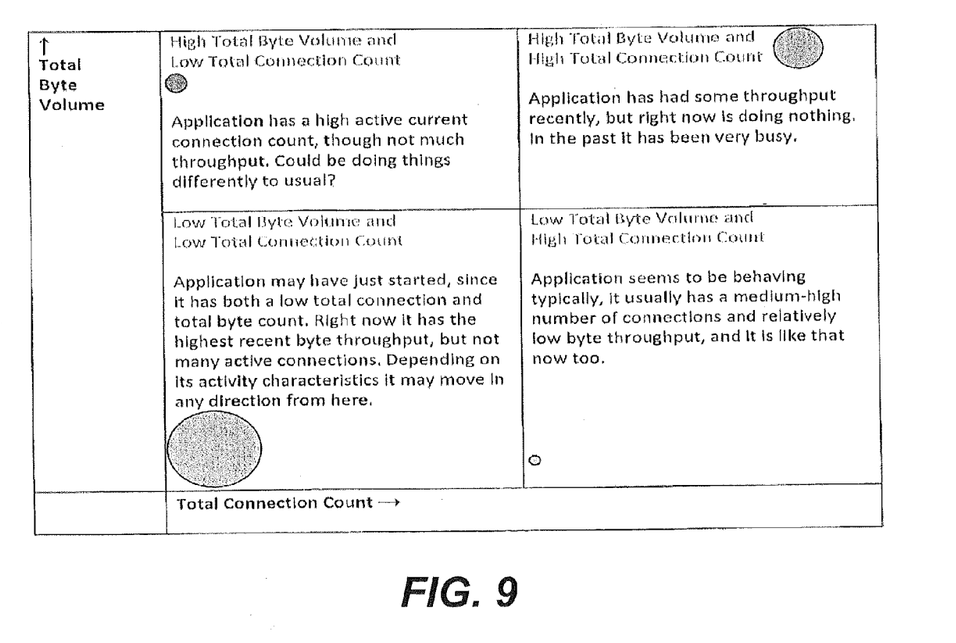
FIG. 9 is a cognitive map for visualizing the performance of a mainframe computer system according to some embodiments of the inventive subject matter.

The bearing map is combined with the object sketch map as shown in FIG. 9 to generate the cognitive map. Four different sectors are shown in the cognitive map, which are defined by the total byte volume and total connection count parameters used in the bearing map. Recent activity with respect to byte throughput and number of active connections is represented by the size and color of the data objects, respectively.

Figure 10A:
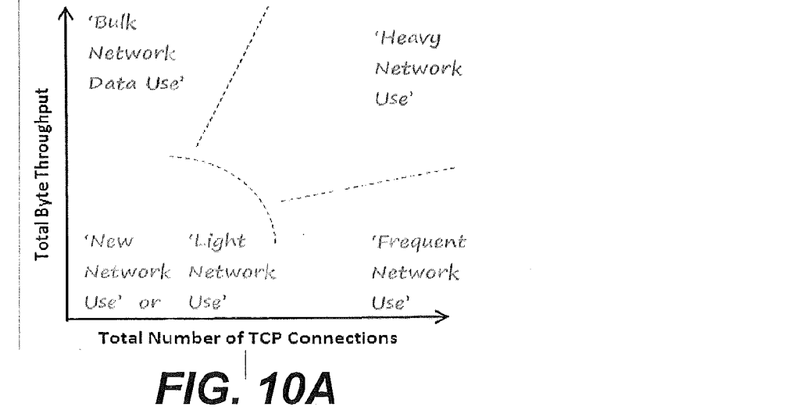
FIGS. 10A-10C are graphical illustrations of the cognitive map of FIG. 9 that illustrate various system management performance scenarios according to some embodiments of the inventive subject matter.
Figure 10B:
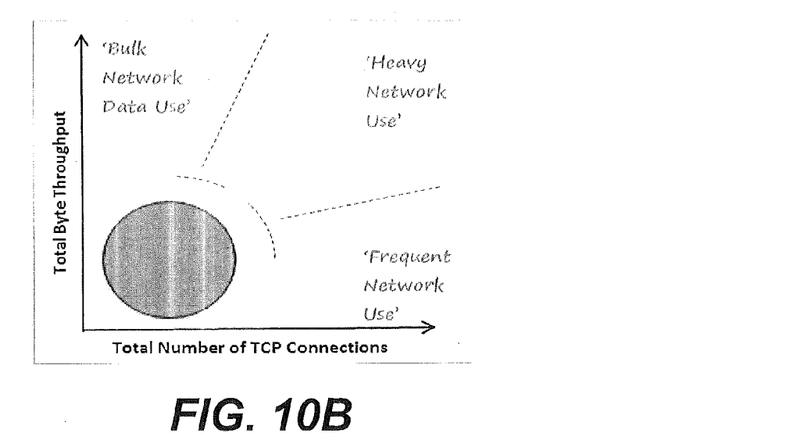
Figure 10C:
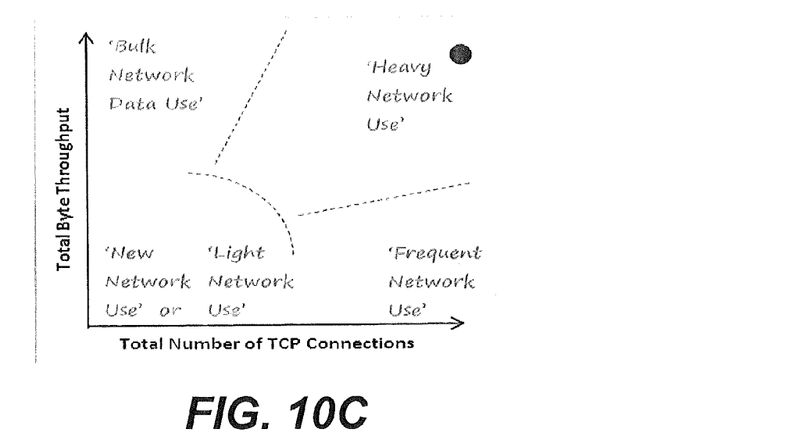

FIGS. 10A-10C illustrates the cognitive map of FIG. 9 for various illustrate various system management performance scenarios according to some embodiments of the inventive subject matter. As shown in FIG. 10A, the cognitive map may be divided into four general sectors in which the sector closest to the origin of the graph represents a performance scenario in which the computer system has recently started up and/or there is relatively light TCP/IP traffic and light data throughput. The sector corresponding to the lower portion of the graph on the right side is indicative of relatively high TCP/IP traffic, but relatively low data throughput. The sector corresponding to the upper portion of the graph on the left side is indicative of relatively high data throughput, but relatively low TCP/IP traffic. The sector corresponding to the upper portion of the graph on the right side is indicative of relatively high data throughput and relatively high TCP/IP traffic. The cognitive map of FIG. 10B illustrates a scenario where a task has recently started. The data object representing the task is positioned near the origin of the cognitive map and indicates that it is associated with a relatively low amount of data throughput and TCP/IP connections. It's relatively large size, however, indicates that recent data throughput is relatively large and its color indicates that is has a medium number of currently active TCP/IP connections. At system start, all tasks have zero historical totals and are concentrated around the origin of the cognitive map. As the computer system operates over time, repeatedly used tasks will—as their historical totals accumulate—move away from the origin in horizontal, vertical, or diagonal directions towards the outer areas of the map. "Total Byte Throughput" and "Total Number of TCP Connections" historical totals are persistent and maintained for each task name as long as the computer system monitoring stays up across multiple restarts of the same task name. Restart if the system or of the monitoring will zero all historical totals for all tasks. The cognitive map of FIG. 10C illustrates a scenario where a task has been operable for some period of time on the computer system. Based on the data object's position on the cognitive map, the task has historically had both high data throughput and a high total number of TCP/IP connections. Based on the data object's size, the data throughput associated with the task has been relatively small in a recent time interval. Based on the data object's color, however, the task currently has a relatively high number of TCP/IP connections.

Figure 11:
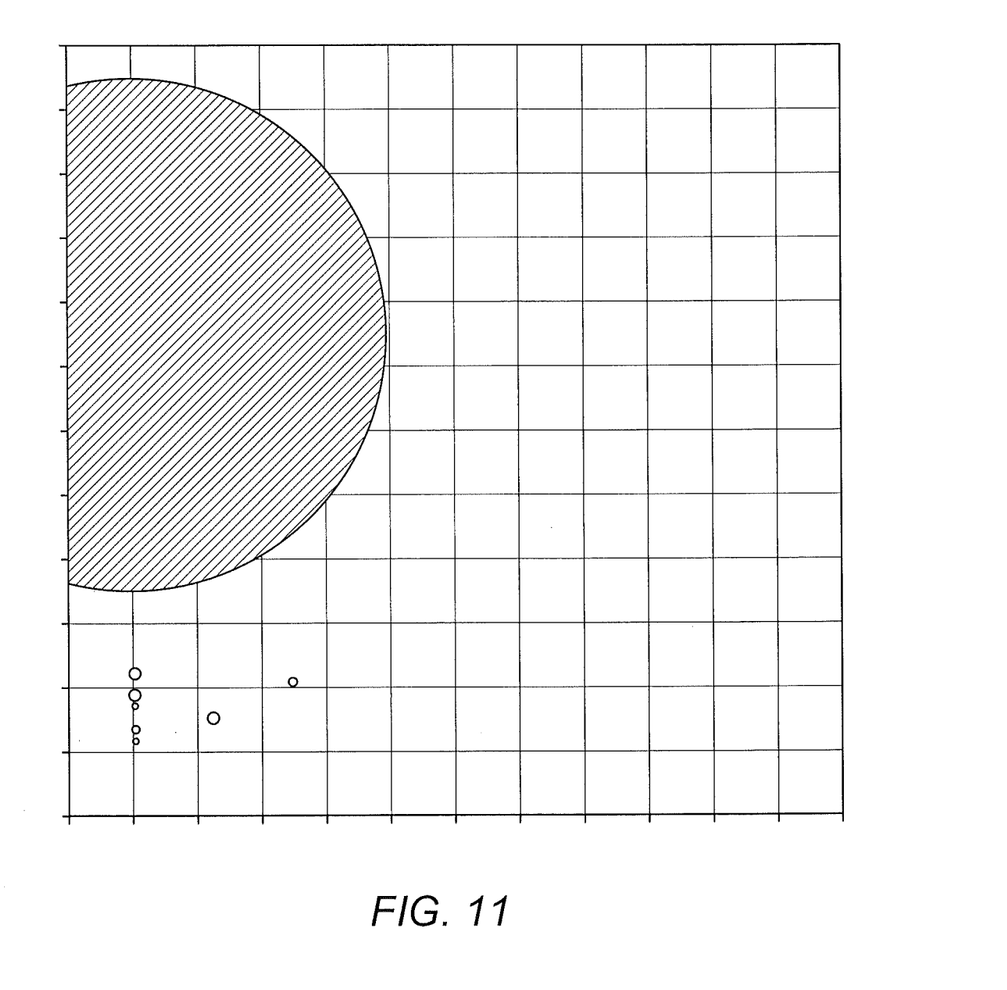
FIG. 11 is a cognitive map including example metric data for visualizing the performance of a mainframe computer system according to some embodiments of the inventive subject matter.

FIG. 11 illustrates a cognitive map with example data for the mainframe computer system performance example. As shown in FIG. 11, byte throughput in the last five minutes has been dominated by one application. Despite its traffic, the application has few active connections.

The examples of FIGS. 7-11 illustrate an example cognitive map for a computer system for a metric data snapshot taken at a particular point in time. Multiple cognitive maps may be generated over time and can be displayed consecutively to provide a visualization of how the computer system performance changes over time. The cognitive maps can be displayed via a slideshow or even in a video format to highlight changes in the computer system performance over time.

The embodiments of methods, systems, and computer program products described herein may allow for the performance of a data processing system to be assessed with a glance. A system administrator, for example, may gain many visual cues about the performance of a data processing system without the need to examine the figures in detail. The colors used for the data objects may act like a "heat map." The data object sizes may identify the most important elements to monitor in the data processing system. The bearing map may be used to define quadrants or zones of concerns when data objects migrate towards these areas. Embodiments of the inventive subject matter may, therefore, enable a user to make extended comparisons between data object behavior and system activity and may allow the user to test hypotheses without cognitive overload. A user can associate visual patterns in the cognitive map with system workload activity and compare them between intervals. For example, a system monopolized by one long-running busy application is visualized on the cognitive map as a large data object in the top right sector. A system where several applications have equal workload may be visualized by even-sized data objects. A user can see that a particular visual pattern is the same kind of activity that was seen before when a problem arose or that a particular visual pattern is the same kind of activity that didn't indicate any type of performance problem.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and That which is claimed:

1. A method, comprising:
performing operations as follows on a processor:
defining a bearing map having an axis corresponding to a first metric, the first metric being based on system management performance for a first defined time interval;
defining an object sketch map corresponding to a second metric, the second metric being based on system management performance for a second defined time interval; and
combining the bearing map and the object sketch map so as to generate a cognitive map, the cognitive map comprising a data object having a position on the axis based on a first value for the first metric and an appearance based on a second value for the second metric;
wherein the axis is a first axis and wherein defining the bearing map comprises:
defining the bearing map having the first axis corresponding to the first metric and a second axis perpendicular to the first axis corresponding to a third metric, the first metric and the third metric being based on system management performance over the first defined time interval and the first axis and the second axis defining a two dimensional grid; and
wherein the cognitive map comprises the data object having a position on the two dimensional grid based on the first value for the first metric and a third value for the third metric and an appearance based on the second value for the second metric; and
wherein the first, second, and third metrics correspond to respective data object operations in the system.

2. The method of claim 1, wherein the appearance is a shape of the data object on the cognitive map.

3. The method of claim 1, wherein the appearance is a color of the data object on the cognitive map.

4. The method of claim 1, wherein the first time interval begins at a start time and the second defined time interval begins after the start time.

5. The method of claim 1, wherein defining the object sketch map comprises:
defining the object sketch map corresponding to the second metric and a fourth metric, the second metric and the fourth metric being based on system management performance for the second defined time interval and a third defined time interval, respectively; and
wherein the cognitive map comprises the data object having the position on the two dimensional grid based on the first value for the first metric and the third value for the third metric, a shape based on the second value for the second metric, and a color based on a fourth value for the fourth metric.

6. The method of claim 1, wherein generating the cognitive map further comprises a plurality of data objects having positions on the axis based on a plurality of first values for the first metric and a plurality of appearances based on a plurality of second values for the second metric, respectively.

7. The method of claim 6, further comprising:
selecting one of the plurality of data objects for removal; and
generating the cognitive map based on remaining ones of the plurality of data objects by excluding the one of the plurality of data objects that was selected for removal.

8. The method of claim 6, further comprising:
defining filter criteria based on the first metric, the second metric, a pattern formed by the plurality of data objects, a transition between patterns formed by the plurality of data objects over time, and/or time; and
applying the filter criteria to the plurality of data objects of the cognitive map to identify which ones of the plurality of data objects satisfy the filter criteria.

9. The method of claim 1, wherein the bearing map is a first bearing map, the object sketch map is a first object sketch map, the cognitive map is a first cognitive map, and the data object is a first data object, the method further comprising:
defining a second bearing map having an axis corresponding to the first metric, the first metric being based on system management performance for a third defined time interval;
defining a second object sketch map corresponding to the second metric, the second metric being based on system management performance for a fourth defined time interval;
combining the second bearing map and the second object sketch map so as to generate a second cognitive map, the second cognitive map comprising a second data object having a position on the axis based on third value for the first metric and an appearance based on a fourth value for the second metric; and
displaying the first and second cognitive maps consecutively.

10. A system, comprising:
a processor; and
a memory coupled to the processor and comprising computer readable program code embodied in the memory that when executed by the processor causes the processor to perform operations comprising:
defining a bearing map having an axis corresponding to a first metric, the first metric being based on system management performance for a first defined time interval;
defining an object sketch map corresponding to a second metric, the second metric being based on system management performance for a second defined time interval; and
combining the bearing map and the object sketch map so as to generate a cognitive map, the cognitive map comprising a data object having a position on the axis based on a first value for the first metric and an appearance based on a second value for the second metric;
wherein the axis is a first axis and wherein defining the bearing map comprises:
defining the bearing map having the first axis corresponding to the first metric and a second axis perpendicular to the first axis corresponding to a third metric, the first metric and the third metric being based on system management performance over the first defined time interval and the first axis and the second axis defining a two dimensional grid; and
wherein the cognitive map comprises the data object having a position on the two dimensional grid based on the first value for the first metric and a third value for the third metric and an appearance based on the second value for the second metric;
wherein the first, second, and third metrics correspond to respective data object operations in the system.

11. The system of claim 10, wherein the appearance is a shape of the data object on the cognitive map.

12. The system of claim 10, wherein the appearance is a color of the data object on the cognitive map.

13. The system of claim 10, wherein the first time interval begins at a start time and the second defined time interval begins after the start time.

14. The system of claim 10, wherein defining the object sketch map comprises:
    defining the object sketch map corresponding to the second metric and a fourth metric, the second metric and the fourth metric being based on system management performance for the second defined time interval and a third defined time interval, respectively; and
    wherein the cognitive map comprises the data object having the position on the two dimensional grid based on the first value for the first metric and the third value for the third metric, a shape based on the second value for the second metric, and a color based on a fourth value for the fourth metric.

15. The system of claim 10, wherein generating the cognitive map further comprises a plurality of data objects having positions on the axis based on a plurality of first values for the first metric and a plurality of appearances based on a plurality of second values for the second metric, respectively.

16. The system of claim 15, wherein the operations further comprise:
    selecting one of the plurality of data objects for removal; and
    generating the cognitive map based on remaining ones of the plurality of data objects by excluding the one of the plurality of data objects that was selected for removal.

17. The system of claim 15, wherein the operations further comprise:
    defining filter criteria based on the first metric, the second metric, a pattern formed by the plurality of data objects, a transition between patterns formed by the plurality of data objects over time, and/or time; and
    applying the filter criteria to the plurality of data objects of the cognitive map to identify which ones of the plurality of data objects satisfy the filter criteria.

18. The system of claim 10, wherein the bearing map is a first bearing map, the object sketch map is a first object sketch map, the cognitive map is a first cognitive map, and the data object is a first data object, wherein the operations further comprise:
    defining a second bearing map having an axis corresponding to the first metric, the first metric being based on system management performance for a third defined time interval;
    defining a second object sketch map corresponding to the second metric, the second metric being based on system management performance for a fourth defined time interval;
    combining the second bearing map and the second object sketch map so as to generate a second cognitive map, the second cognitive map comprising a second data object having a position on the axis based on third value for the first metric and an appearance based on a fourth value for the second metric; and
    displaying the first and second cognitive maps consecutively.

19. An article of manufacture, comprising:
    a non-transitory computer readable storage medium comprising computer readable program code embodied in the medium that when executed by a processor causes the processor to perform operations comprising:
    defining a bearing map having an axis corresponding to a first metric, the first metric being based on system management performance for a first defined time interval;
    defining an object sketch map corresponding to a second metric, the second metric being based on system management performance for a second defined time interval; and
    combining the bearing map and the object sketch map so as to generate a cognitive map, the cognitive map comprising a data object having a position on the axis based on a first value for the first metric and an appearance based on a second value for the second metric;
    wherein the axis is a first axis and wherein defining the bearing map comprises:
    defining the bearing map having the first axis corresponding to the first metric and a second axis perpendicular to the first axis corresponding to a third metric, the first metric and the third metric being based on system management performance over the first defined time interval and the first axis and the second axis defining a two dimensional grid; and
    wherein the cognitive map comprises the data object having a position on the two dimensional grid based on the first value for the first metric and a third value for the third metric and an appearance based on the second value for the second metric; and
    wherein the first, second, and third metrics correspond to respective data object operations in the system.

20. The article of manufacture of claim 19, wherein the appearance is a shape of the data object on the cognitive map.

21. The article of manufacture of claim 19, wherein the appearance is a color of the data object on the cognitive map.

22. The article of manufacture of claim 19, wherein the first time interval begins at a start time and the second defined time interval begins after the start time.

23. The article of manufacture of claim 19, wherein defining the object sketch map comprises:
    defining the object sketch map corresponding to the second metric and a fourth metric, the second metric and the fourth metric being based on system management performance for the second defined time interval and a third defined time interval, respectively; and
    wherein the cognitive map comprises the data object having the position on the two dimensional grid based on the first value for the first metric and the third value for the third metric, a shape based on the second value for the second metric, and a color based on a fourth value for the fourth metric.

24. The article of manufacture of claim 19, wherein the cognitive map further comprises a plurality of data objects having positions on the axis based on a plurality of first values for the first metric and a plurality of appearances based on a plurality of second values for the second metric, respectively.

25. The article of manufacture of claim 24, wherein the operations further comprise:
    selecting one of the plurality of data objects for removal; and
    generating the cognitive map based on remaining ones of the plurality of data objects by excluding the one of the plurality of data objects that was selected for removal.

26. The article of manufacture of claim 24, wherein the operations further comprise:
    defining filter criteria based on the first metric, the second metric, a pattern formed by the plurality of data objects, a transition between patterns formed by the plurality of data objects over time, and/or time; and
    applying the filter criteria to the plurality of data objects of the cognitive map to identify which ones of the plurality of data objects satisfy the filter criteria.

27. The article of manufacture of claim 19, wherein the bearing map is a first bearing map, the object sketch map is a first object sketch map, the cognitive map is a first cognitive map, and the data object is a first data object, wherein the operations further comprise:
- defining a second bearing map having an axis corresponding to the first metric, the first metric being based on system management performance for a third defined time interval;
- defining a second object sketch map corresponding to the second metric, the second metric being based on system management performance for a fourth defined time interval;
- combining the second bearing map and the second object sketch map so as to generate a second cognitive map, the second cognitive map comprising a second data object having a position on the axis based on third value for the first metric and an appearance based on a fourth value for the second metric; and
- displaying the first and second cognitive maps consecutively.

* * * * *